United States Patent [19]

Shimokawa et al.

[11] 4,072,323
[45] Feb. 7, 1978

[54] PASSIVE SEAT BELT DEVICE

[75] Inventors: Toshiaki Shimokawa, Nishio; Kunitaka Suzuki, Toyota, both of Japan

[73] Assignees: Nippon Soken, Inc., Nishio; Toyota Jidosha Kogyo Kabushiki Kaisha, Toyota, both of Japan

[21] Appl. No.: 631,238

[22] Filed: Nov. 12, 1975

[30] Foreign Application Priority Data

Nov. 14, 1974 Japan .......................... 49-138189[U]

[51] Int. Cl.² ............................................. B60R 21/02
[52] U.S. Cl. ...................................... 280/745; 280/747
[58] Field of Search ................... 280/744, 745, 747; 180/82 C; 297/388, 389

[56] References Cited

U.S. PATENT DOCUMENTS

| 3,567,247 | 3/1971 | Sobkow et al. | 280/747 |
| 3,680,883 | 8/1972 | Keppel et al. | 280/745 |
| 3,770,078 | 11/1973 | Keppel et al. | 280/745 |
| 3,831,974 | 8/1974 | Keppel | 280/745 |
| 3,834,730 | 9/1974 | Kansier | 280/747 |
| 3,860,260 | 1/1975 | Kazoaka et al. | 280/745 |
| 3,889,971 | 6/1975 | Kazaoka | 280/745 |

Primary Examiner—Joseph F. Peters, Jr.
Assistant Examiner—Michael J. Forman
Attorney, Agent, or Firm—Cushman, Darby & Cushman

[57] ABSTRACT

A passive seat belt device for a motor-vehicle occupant has at least a shoulder belt which is secured at its one end to the inner, side upper wall portion of a compartment of the vehicle and used for binding the breast portion of the occupant. A drive mechanism is provided for automatically bringing the seat belt in tightening and releasing positions for the occupant in response to the opening and closing operations of a door of the vehicle. A support secured to the inner, side wall portion of said compartment on the side of said secured one end of said shoulder belt guides the shoulder belt in a manner to keep the shoulder belt apart from the neck portion of said occupant.

6 Claims, 5 Drawing Figures

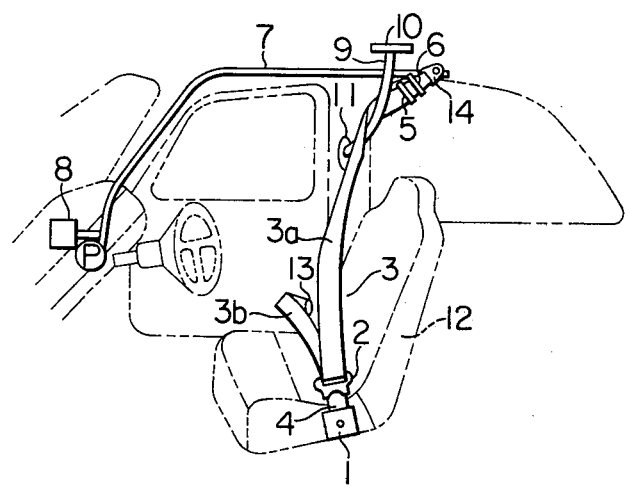
FIG. 1
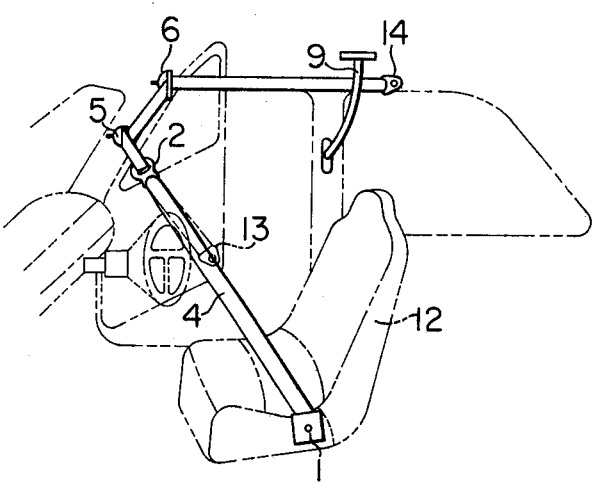
FIG. 2
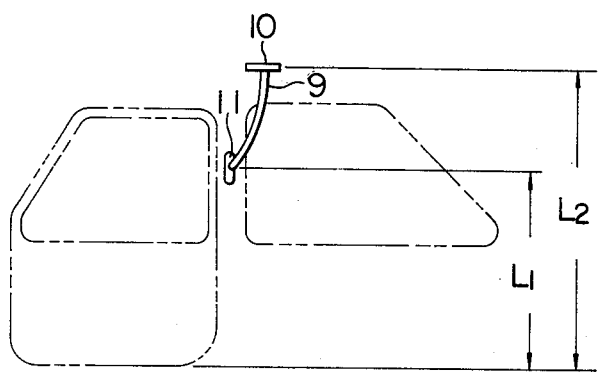
FIG. 3a
FIG. 4
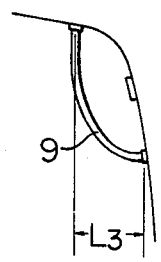
FIG. 3b

PASSIVE SEAT BELT DEVICE

BACKGROUND OF THE INVENTION

1. Field of the Invention

The present invention relates to a passive seat belt device for use in a motor vehicle, which has a shoulder belt automatically brought into its tightening and releasing positions in response to the opening and closing operations of a door of a motor vehicle.

2. Description of the Prior Art

In a seat belt device, having a shoulder belt, for use in a motor vehicle, one end of the shoulder belt is fixed to the inner wall of a compartment at the position behind the shoulder of an occupant in order to tightly hold the breast portion of the occupant. This shoulder belt, however, tends to contact with the neck portion of an occupant in its tightening position to thereby bring about an uncomfortable feeling for the occupant.

In a manual seat belt it is known to fix a small hook to the side portion of the head rest of a seat cushion, with which a shoulder belt is engaged. The small hook keeps the shoulder belt away from the neck portion of an occupant by positioning the one end portion of the shoulder belt downward of the fixing end of the same.

However, such a small hook cannot be applied to a passive seat belt since it does not allow the shoulder belt to move upward and downward therein and thus does not hold the same. Further, in a passive seat belt device, the shoulder belt sometimes contacts with the neck portion of an occupant when the seat belt is automatically moved away from the occupant at a high speed in response to the opening operation of the door.

SUMMARY OF THE INVENTION

It is accordingly a principal object of the present invention to provide an improved passive seat belt device which avoids the aforesaid shortcomings experienced with the prior art device of the type described, in which a shoulder belt tightens or binds the breast portion of an occupant, with one end of the shoulder belt secured to the inner, upper side wall of a compartment of a vehicle.

It is another object of the present invention to provide an improved passive seat belt device which eliminates the possibility of a shoulder belt contacting with the neck portion of an occupant in the tightened position of the shoulder belt.

It is a yet another object of the present invention to provide an improved passive seat belt device which keeps a shoulder belt apart from the neck portion of an occupant, at the time of operation of a drive mechanism for the passive seat belt device.

It is a still another object of the present invention to provide an improved passive seat belt device which may absorb impact energy, by allowing plastic deformation or rupture for a support arm due to a load being exerted on an occupant, in the event of collision of a vehicle, and which device is less expensive than heretofore known.

According to the present invention, there is provided a passive seat belt device for use in a motor vehicle in which a support arm for supporting one end portion of a shoulder belt is provided in the vertical direction within a compartment of the vehicle in a manner such that a shoulder belt can move upward and downward within the support arm. The support arm positions one end portion of the shoulder belt away from the neck portion of an occupant to thereby keep the shoulder belt away from the neck portion of the occupant.

BRIEF DESCRIPTION OF THE DRAWINGS

FIGS. 1 and 2 are diagrammatic views of the passive seat belt means embodying the present invention, shown in the open and closed positions of a door of a vehicle;

FIGS. 3(a), (b) are diagrammatic views illustrative of the attaching condition of a support arm; and FIG. 4 is a diagrammatic view showing another embodiment of the invention.

DESCRIPTION OF THE PREFERRED EMBODIMENTS

Referring now to FIGS. 1 and 2, a retracter 1, which is adapted to wind and pay out an inner belt 4, is secured to the inner side portion of a seat cushion 12 in a compartment of a motor vehicle. The retractor 1 is of a known type in which a locking device (not shown) locks a belt winding real (not shown) only when a large impact is exerted to an occupant, such as in the event of collision of a vehicle, to thereby stop the inner belt 4 from being paid out from the retracter 1. The inner belt 4 is made of a material having a low elongation and high tensile strength, such as a wire belt having steel wires woven therein, so that the inner belt having a small thickness may present sufficient strength and renders the retracter small in size. A slip joint 2 is secured to one end of the inner belt 4. A seat belt 3 made of a single continuous webbing is secured at its one end to the inner, upper portion of a side wall of the compartment behind the seat cushion 12 by means of a shoulder anchor 14, and at the other end to the inner, lower portion of a door on the side opposite to hinges of the door by means of a lap anchor 13. The seat belt 3 passes through and is movably supported by the slip joint 2 to be divided into a shoulder belt portion 3a and a lap belt portion 3b.

The shoulder belt 3a is hanged by first and second hangers 5 and 6 both of which are held by sliders (not shown). A cable (not shown) made of Duracon (Trade name) which is one kind of polyacetal resin is connected to both sliders for moving the shoulder belt 3a away from or towards an occupant. More specifically, the slider of the first hanger 5 is secured to the tip of the cable so as to move integrally therewith, while the slider of the second hanger 6 is in sliding engagement with the cable so as to move between the position shown in FIG. 1 (a tightened position of the shoulder belt 3a) and the position shown in FIG. 2 (a released position of the shoulder belt 3a so as to allow the driver to get off a vehicle).

A roof-side rail 7 runs along the inner roof wall of a vehicle to guide the aforesaid sliders and cable. That is, the sliders engage with the rail 7 and the cable runs within the rail 7. A drive motor 8, the direction of rotation of which is reversed in response to the opening and closing operations of a door according to a switch (not shown), is connected to the cable through a pulley P. Thus, when the door is opened, the motor 8 rotates to move the cable to thereby shift the first and second hangers 5 and 6 from the positions close to the shoulder anchor 14 as shown in FIG. 1 to the positions close to the upper front portion of the door as shown in FIG. 2. On the other hand, when the door is closed, the first and second hangers 5 and 6 are moved towards the shoulder anchor 14 in response to the closing operation of the door. The first and second hangers 5 and 6, the roofside rail 7, the drive motor 8 and pulley 7 constitute a drive mechanism.

Shown at 9 is a support arm which is secured at one end thereof through the medium of a stay 10 to the inner roof portion of the compartment on the side of the secured one end of the seat belt 3 and at the other end thereof through the medium of a stay 11 to the center pillar of the vehicle in a manner to position one end of the shoulder belt 3a sideways and to keep the shoulder belt 3a away from the neck portion of an occupant. The support arm extends over the rail 7 in the vertical direction from the inner roof portion of the compartment to the center pillar so that the shoulder belt engages with the support arm whenever it is moved toward an occupant and is allowed to move upward and downward within the support arm. The support arm 9 is made of a flexible material, such of the type a flexible wire as used with a fluorescent lamp, a phosphorous bronze plate whose surface is treated with resin, or those made of a soft resin and the like, so as to be suited for the variation in size of the bodies of occupants.

The support arm 9 is positioned above the shoulder of an occupant.

The position of the support arm, which may be somewhat dependent on the type of a vehicle, is such as shown in FIGS. 3 (a), (b). For instance, the height of the support arm 9 as measured from the floor of the compartment to the lower end of the arm 9 is $L_1 = 760$ mm, and the height up to the top end of the arm 9 is $L_2 = 980$ mm and the horizontal distance between the vertical line extending downwards from the top end of the arm 9 to the side wall of the compartment is $L_3 = 100$ mm.

Now, the description will be turned to the operation of the seat belt device according to the present invention. In the closed position of a door as shown in FIG. 1, the shoulder belt 3a and lap belt 3b of the belt 3 which is made of a continuous webbing, are in tightened positions where the occupant is tightened or bound on his breast and waist portions of his body. Due to the provision of the support arm 9, the shoulder belt 3a is held away from the neck portion of the occupant, so that an uncomfortable feeling caused by the shoulder belt contacting the neck portion of the occupant may be eliminated. The retractor 1 allows the inner belt 4 to be freely paid out therefrom or wound therein, unless a very large impact is exerted on the inner belt 4. As a result, the movements of the occupant which are required for manipulating switches and the like which are mounted in front of the occupant, will not be hindered at all.

On the other hand, if a large impact is exerted on the inner belt 4 such as due to the collision of a vehicle in the aforesaid tightening condition of the belt, then the retracter 1 stops paying out the inner belt 4. In this respect, the inner belt 4 is made of a wire belt, so that the elongation of the inner belt 4, is minimized. The load being applied to the shoulder belt portion 3a is partly absorbed by the support arm 9, while the rest of the load is attended upon by the shoulder anchor 14.

As a result, the occupant is held in position by means of the shoulder belt 3a and the lap belt 3b of the belt 3, in such a manner that the movement of the occupant is limited to a given extent, thus preventing the secondary collision of the occupant on a steering wheel and the like.

Meanwhile, at the time when the occupant opens a door as shown in FIG. 2 to get off the vehicle, the drive motor 8 in the belt drive mechanism is driven, so that the cable engaging the first and second hangers 5 and 6 commences shifting along the roof-side rail 7 therethrough. The shifting of the first and second hangers 5 and 6 causes the shoulder belt 3a to be lifted or moved away from the occupant. In this operation, the support arm 9 keeps the shoulder belt 3a away from the neck portion of an occupant.

In this case, the support arm 9 extends in the vertical direction in the compartment and is spaced a sufficient distance from the roof-side rail 7 so that there may be left an ample space over the support arm 9. This eliminates the possibility of the first and second hangers jamming around the support arm 9, permitting the smooth movement of the shoulder belt 3a.

In addition, since the shoulder belt 3a is lifted to the position along the roof side with the inner belt 4 paid out from the retracter 1, the occupant can easily and smoothly get off the vehicle. Thus, the seat belt will be positioned as shown in FIG. 2, to thereby allow the smooth movement of the occupant getting in and out of the vehicle. The support arm 9 which is made of a flexible material does not disturb the smooth drive of the seat belt 3 by means of the drive motor 8.

When the door is closed after the occupant has got in the vehicle, then the drive motor 8 is driven so as to allow the seat belt 3 to tighten the occupant in position, whereupon the inner belt 4 is wound by the retracter 1 therein, so that the seat belt assumes its occupant-tightening position.

Since the inner belt 4 is extended or appears only when the occupant gets in and out a vehicle as apparent from the above operation, there results no discrepancies accruing from the fact that the aforesaid inner belt 4 is made of a material of low elongation and high tensile strength.

In passing, the support arm 9 in the aforesaid embodiment is secured at its end to the inner roof portion of the compartment and at the other end to the center pillar therein. However, in the case of a vehicle which is devoid of the center pillar as can be seen in a hard top vehicle, only one end of the support arm 9 may be secured to the inner roof portion of a compartment by the medium of the stay 10 as shown in FIG. 4, or may be secured to the side of the seat cushion 12, although the latter instance is not shown.

In addition, the support arm in the aforesaid embodiment is made of a flexible material. However, this should not be construed in a limitative sense. For instance, the support arm may be made of a spring material which tends to be deflected when a winding force of the retracter is directly applied to the belt 3, but tends not to be deflected when a winding force of the retracter 1 is not being directly impressed on the support arm 9, as in the case where the belt 3 is extended or retracted in the normal movement of the occupant getting on and off a vehicle.

As is apparent from the foregoing description of the passive seat belt according to the present invention, the support arm which supports the shoulder belt is provided so as to extend over the rail in the vertical direction, while the shoulder belt runs through the support arm, so that the shoulder belt is kept away from the neck portion of an occupant, even in case the drive mechanism for the passive seat belt device is in operation, thereby eliminating the possibility of the shoulder belt contacting the neck portion of an occupant, and hence causing an uncomfortable feeling to arise therefrom. In addition, part of a load to be caused by the collision of a vehicle may be effectively absorbed due to the support arm being subjected to an elastic deformation or rupture. Still furthermore, the seat belt device according to the invention may be readily applied to the conventional type seat belt devices.

What is claimed is

1. A passive seat belt device for use with an occupant in a motor vehicle comprising: a seat belt means having at least a shoulder belt which is secured at its one end to the inner and upper side portion of a compartment of the vehicle for tightening said occupant in position; a drive mechanism including a rail running along the side edge of the inner roof portion of said compartment, hanger means which slidably hang said shoulder belt and being capable of shifting along said rail forwards and rearwards, said seat belt driving means automatically bringing said seat belt means into an occupant-tightening position when a door of the vehicle is closed and into an occupant-releasing position when said door is opened; and a support arm which is positioned over said rail a short distance from the inner side wall of said compartment with its opposed ends fixed above and below said rail and spaced forward of the rearward end position of said hanger means along said rail and with which said shoulder belt engages to be kept away from the neck portion of said occupant, said support arm extending in the vertical direction so that said shoulder belt is allowed to move upwards and downwards in engagement with said support arm whenever said seat belt means is moved toward said occupant.

2. A passive seat belt device as set forth in claim 1, wherein said support arm is secured at its top end to the inner roof portion of the compartment.

3. A passive seat belt device as set forth in claim 2, wherein the lower end of said support arm is secured to a center pillar of the vehicle.

4. A passive seat belt device as set forth in claim 1, wherein the lower end of said support arm is secured to the upper side portion of an occupant's seat back.

5. A passive seat belt device as set forth in claim 1, wherein said support arm is made of a flexible material.

6. A passive seat belt device for use with an occupant in a motor vehicle comprising:

seat belt means including a belt which is secured at its one end to the inner, upper side wall of a compartment of the vehicle and at the other end to the lower portion of a door of the vehicle on the side opposite to hinges of the door, a slip joint dividing the length of said belt into a shoulder belt portion for tightening the breast portion of an occupant and a lap belt portion for tightening the waist portion of said occupant, an inner belt which is secured at its one end to said slip joint and a retracter positioned on the inner side portion of a seat for winding said inner belt;

seat belt driving means including a rail running along the side edge of the inner roof portion of said compartment, hanger members which slidably hang said shoulder belt portion and being capable of shifting along said rail forwards and rearwards, said seat belt driving means automatically bringing said seat belt means into an occupant-tightening position when a door is closed, and into an occupant-releasing position when said door is opened; and support arm means which is positioned a short distance from the inner side wall of said compartment with its opposed ends fixed above and below said rail and spaced forward of the rearward end of said rail, and extends over said rail in the vertical direction so as to allow said shoulder belt to move upward and downward in engagement therewith, said support arm means guiding said shoulder belt portion in a manner to keep the same apart from the neck portion of said occupant whenever said seat belt means is brought into its tightening position.

* * * * *